United States Patent [19]

Hirota et al.

[11] Patent Number: 4,593,327
[45] Date of Patent: Jun. 3, 1986

[54] COLOR VIDEO SIGNAL RECORDING AND/OR REPRODUCING SYSTEM

[75] Inventors: Akira Hirota, Chigasaki; Yoshimichi Nagaoka, Yokohama, both of Japan

[73] Assignee: Victor Company of Japan, Ltd., Japan

[21] Appl. No.: 534,372

[22] Filed: Sep. 21, 1983

[30] Foreign Application Priority Data

Sep. 25, 1982 [JP] Japan .............................. 57-166799

[51] Int. Cl.[4] .......................... H04N 9/491; H04N 5/78
[52] U.S. Cl. .................................... 358/330; 358/310; 358/328
[58] Field of Search ...................... 358/310, 328, 330; 360/18, 20

[56] References Cited

U.S. PATENT DOCUMENTS

| | | | |
|---|---|---|---|
| 3,234,323 | 2/1966 | Kihara | 358/328 |
| 3,730,983 | 5/1973 | Numakura et al. | 360/20 X |
| 3,846,819 | 11/1974 | Warren | 358/328 |
| 4,344,082 | 8/1982 | Ishiodori | 358/328 |
| 4,491,876 | 1/1985 | Aoike et al. | 358/330 |

Primary Examiner—Aristotelis M. Psitos
Attorney, Agent, or Firm—Andrus, Sceales, Starke & Sawall

[57] ABSTRACT

A color video signal recording and reproducing system comprises a circuit for recording and reproducing a recording signal onto and from a recording medium, a modulator for frequency modulating a carrier by a luminance signal separated from an input video signal, a first converter for frequency converting a carrier chrominance signal separated from the video signal into a band which is lower than a band occupied by the frequency modulated luminance signal, a gating circuit for passing the frequency converted carrier chrominance signal with an interval of one track scanning period in which one track on the recording medium is scanned, a first mixer for mixing the frequency modulated luminance signal and the intermittent frequency converted carrier chrominance signal from the gating circuit, where the first mixer alternately produces a mixed multiplexed signal in which the frequency modulated luminance signal and the frequency converted carrier chrominance signal are multiplexed, and a signal solely comprising the frequency modulated luminance signal, for every one track scanning period, and the output signal of the first mixer is the recording signal, a demodulator for demodulating the frequency modulated luminance signal which is separated from a reproduced signal, a processing circuit for processing the intermittent frequency converted carrier chrominance signal which is separated from the reproduced signal, into a continuous carrier chrominance signal in its original band, and a second mixer for mixing the outputs of the demodulator and the processing circuit, to obtain a reproduced color video signal.

8 Claims, 11 Drawing Figures

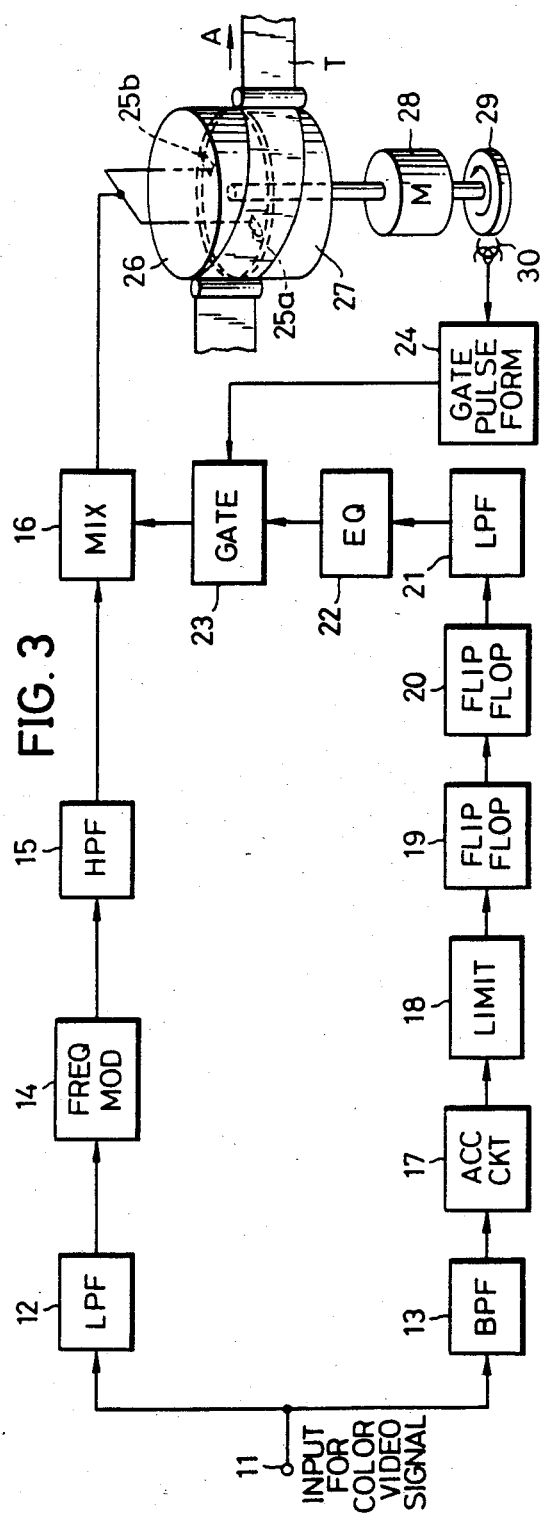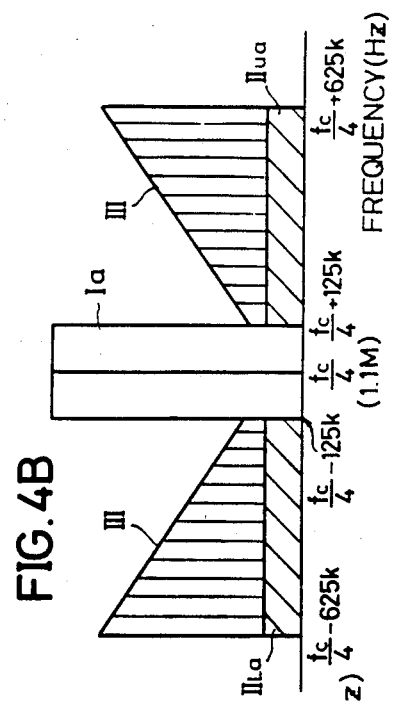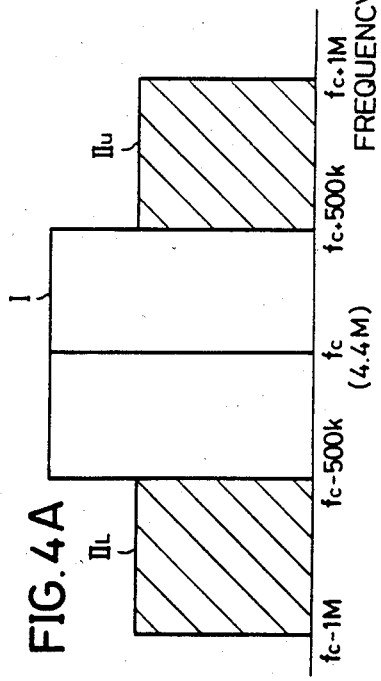
FIG. 3
FIG. 4B
FIG. 4A

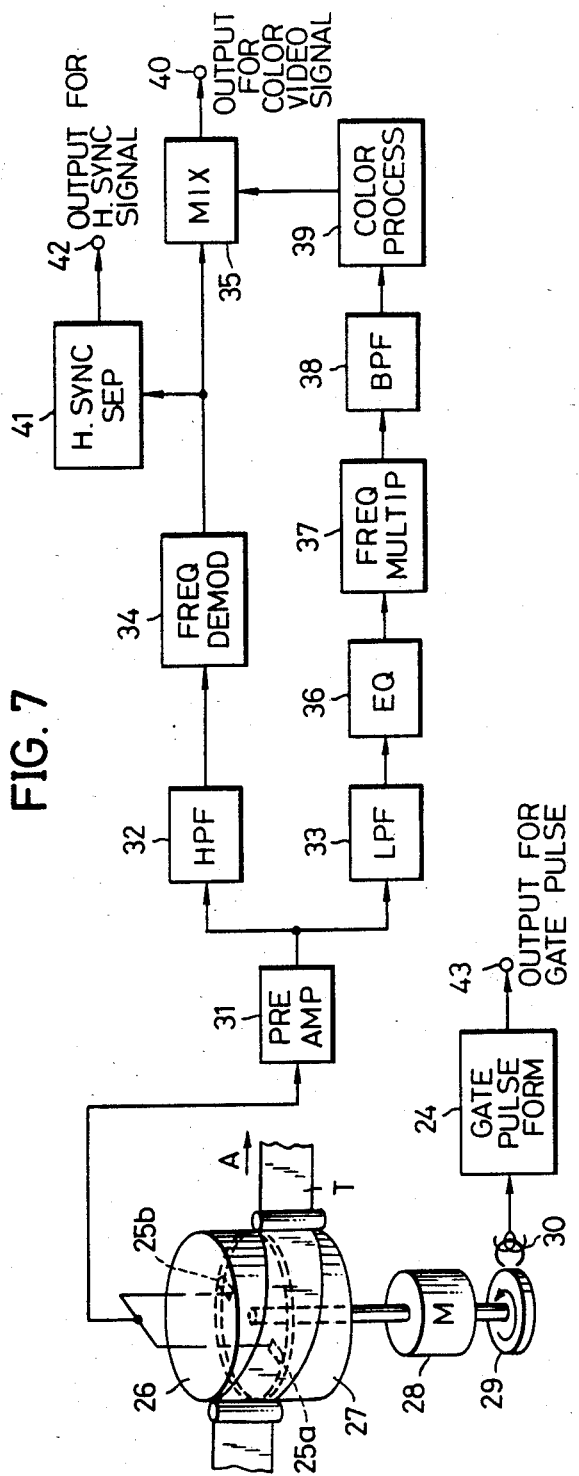

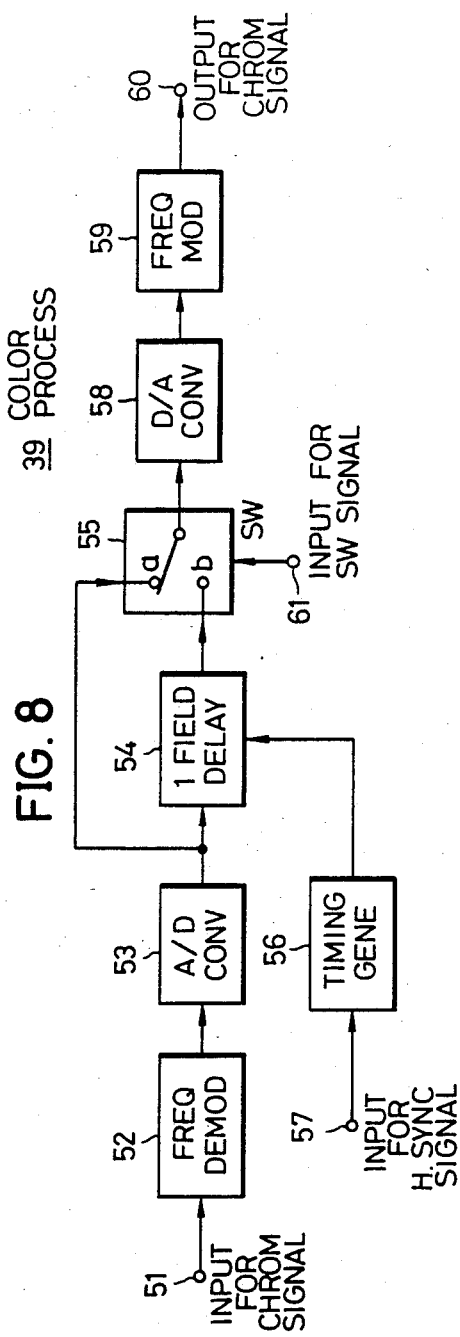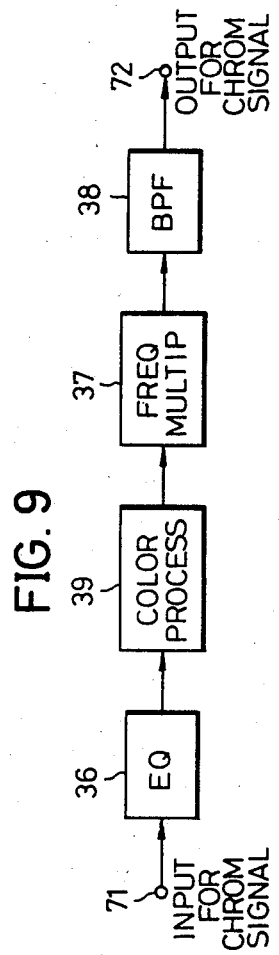

COLOR VIDEO SIGNAL RECORDING AND/OR REPRODUCING SYSTEM

BACKGROUND OF THE INVENTION

The present invention generally relates to color video signal recording and/or reproducing systems, and more particularly to a system for recording and/or reproducing a color video signal so that a high-quality reproduced color picture can be obtained even in a system in which the color video signal is recorded in a manner such that positions on a recording medium where the horizontal synchronizing signals of the color video signal are recorded are not aligned in mutually adjacent tracks which are contiguously formed on the recording medium without a guard band between the mutually adjacent tracks.

Generally, in the recording system of a SECAM system color video signal recording and/or reproducing system, for example, a SECAM system color video signal is supplied to a lowpass filter and a bandpass filter, and a luminance signal is separated and filtered in the lowpass filter while a carrier chrominance signal is separated and filtered in the bandpass filter. As is well known, the above carrier chrominance signal is a signal in which a first frequency modulated signal which is obtained by frequency-modulating a first chrominance subcarrier by a color difference signal B-Y, and a second frequency modulated signal which is obtained by frequency modulating a second chrominance subcarrier by a color difference signal R-Y, are time-sequentially multiplexed in an alternate manner for every one horizontal scanning period (1H). The above carrier chrominance signal having a carrier frequency of 3.9 MHz to 4.75 MHz, for example, is supplied to a frequency dividing circuit wherein the carrier chrominance signal is frequency-divided and converted into a low frequency range. Moreover, the carrier frequency of the carrier chrominance signal is set to a frequency in a range of 0.97 MHz to 1.19 MHz, for example, and the frequency deviation width is reduced. The carrier chrominance signal which is converted into the low frequency range and the frequency modulated luminance signal, are subjected to a frequency-division-multiplexing and then amplified to be formed into a composite color video signal. This composite color video signal is supplied to a pair of magnetic heads having gaps of mutually different azimuth angles.

On the other hand, in the reproducing system, the pair of magnetic heads alternately reproduce the composite color video signal which is recorded on the magnetic recording medium (magnetic tape). The outputs of the pair of magnetic heads are respectively amplified, and are formed into a continuous signal by being switched alternately in a switching circuit. The frequency modulated luminance signal in this continuous signal, is separated and filtered in a highpass filter, and is then demodulated and converted into the luminance signal in a demodulating circuit. The frequency converted carrier chrominance signal in the continuous signal, is separated and filtered in a lowpass filter, and is then supplied to a multiplying circuit wherein the carrier frequency is restored into the original carrier frequency. The output of this multiplying circuit is supplied to a bandpass filter so as to obtain a predetermined frequency band. The reproduced carrier chrominance signal and the reproduced luminance signal from the demodulating circuit, are multiplexed and formed into a reproduced SECAM system color video signal in a multiplexing circuit.

As one example of a track pattern formed on the magnetic tape according to the above described recording and/or reproducing system, there is a track pattern in which mutually adjacent tracks are formed on the magnetic tape without a guard band formed between the adjacent tracks, by use of a pair of magnetic heads having gaps of mutually different azimuth angles. In this type of a track pattern, the positions where the horizontal synchronizing signals are recorded in the adjacent tracks, are arranged to be in alignment along a direction perpendicular to the longitudinal direction of the track, for example. This alignment of the positions where the horizontal synchronizing signals are recorded, is sometimes referred to as an H-alignment. In addition, the frequency modulated signal components of the carrier chrominance signal which is recorded after being frequency converted into the low frequency range, are the same at a certain recorded section in which the frequency converted carrier chrominance signal is recorded and the color difference signal R-Y is frequency modulated, and at a section of an adjacent track which is adjacent to the certain recorded section. Accordingly, very little crosstalk is introduced between the adjacent tracks by the carrier chrominance signal in the low frequency range, and the demodulated color video signal is hardly affected by the crosstalk.

It is sometimes desirable to carry out recording and/or reproduction of a long duration. When carrying out such a long-duration recording and/or reproduction in a magnetic recording and/or reproducing apparatus which forms the track pattern described heretofore, only the tape traveling speed is reduced. That is, the diameter of the drum which carries the magnetic heads, the tape width, the rotational speed of the drum, and the number of horizontal scanning lines all remain unchanged. When carrying out four hours of recording and/or reproduction by use of a magnetic tape which is designed for two hours of recording and/or reproduction, for example, only the tape traveling speed is reduced to ½ the tape traveling speed which would otherwise be used for two hours of recording and/or reproduction with such a magnetic tape. In the track pattern obtained when four hours of recording and/or reproduction is carried out by use of the magnetic tape which is designed for two hours of recording and/or reproduction, the positions where the horizontal synchronizing signals are recorded are not in alignment in the mutually adjacent tracks. Accordingly, no correlation exists between the adjacent tracks, and the carrier frequencies of the carrier chrominance signal in the low frequency range differ in the adjacent tracks. In this case, because the adjacent tracks are recorded by the magnetic heads having gaps of mutually different azimuth angles, the azimuth loss of the frequency modulated luminance signal becomes large in the high frequency range. As a result, with respect to the frequency modulated luminance signal, there is little effect of crosstalk from the adjacent tracks. However, the azimuth loss of the recorded carrier chrominance signal is small because the recorded carrier chrominance signal is in the low frequency range. Moreover, the effect of crosstalk from the adjacent tracks is large with respect to the carrier chrominance signal, since the carrier frequencies of the recorded carrier chrominance signal differ in the adjacent tracks. Thus, beat interference is introduced.

SUMMARY OF THE INVENTION

Accordingly, it is a general object of the present invention to provide a novel and useful color video signal recording and/or reproducing system, in which the above described problems have been eliminated.

Another and more specific object of the present invention is to provide a color video signal recording system for application in a recording system which separates a luminance signal and a carrier chrominance signal from a color video signal, frequency-modulates the separated luminance signal, frequency-converts the separated carrier chrominance signal into a frequency range which is lower than the frequency band of the frequency modulated luminance signal, subjects the frequency modulated luminance signal and the frequency converted carrier chrominance signal to a frequency-division-multiplexing, and records the frequency division multiplexed signal onto a recording medium. The color video signal recording system according to the present invention continuously records the frequency modulated luminance signal on successive tracks, and intermittently multiplexes the frequency converted carrier chrominance signal with the frequency modulated luminance signal, for every recording period of one track, so as to intermittently record the multiplexed signal for every recording period of one track, so that one of mutually adjacent tracks is only recorded with the frequency modulated luminance signal and the other of the mutually adjacent tracks is recorded with a signal in which the frequency modulated luminance signal and the frequency converted carrier chrominance signal are multiplexed.

Still another object of the present invention is to provide a color video signal recording and/or reproducing system for application in a recording and/or reproducing system which separates a luminance signal and a carrier chrominance signal from a color video signal, frequency-modulates the separated luminance signal, frequency-converts the separated carrier chrominance signal into a frequency range which is lower than the frequency band of the frequency modulated luminance signal, subjects the frequency modulated luminance signal and the frequency converted carrier chrominance signal to a frequency-division-multiplexing, and records and/or reproduces the frequency division multiplexed signal onto and/or from a recording medium. The color video signal recording and/or reproducing system according to the present invention only records the frequency modulated luminance signal on one of mutually adjacent tracks which are successively formed on the recording medium, and records a signal in which the frequency modulated luminance signal and the frequency converted carrier chrominance signal are multiplexed on the other of the mutually adjacent tracks. Upon reproduction, the frequency converted carrier chrominance signal which is reproduced from the recording medium, is restored to the carrier chrominance signal in the original frequency band in a processing circuit. This processing circuit comprises a delay circuit for delaying the reproduced frequency converted carrier chrominance signal or the reproduced carrier chrominance signal by a reproducing period of one track, and a switching circuit for selectively producing an input signal and an output signal of the delay circuit in an alternate manner for every reproducing period of one track. This switching circuit obtains the output carrier chrominance signal of the delay circuit during a period in which a track which is only recorded with the frequency modulated luminance signal is being reproduced. The reproduced carrier chrominance signal obtained from the processing circuit, is multiplexed with a reproduced luminance signal which is obtained by demodulating the frequency modulated luminance signal which is reproduced from the recording medium, so as to obtain a reproduced color video signal.

According to the system of the present invention, only one of the mutually adjacent tracks is recorded with the frequency converted carrier chrominance signal. Thus, it is possible to ensure that crosstalk components are not reproduced from adjacent tracks when the recorded frequency converted carrier chrominance signal is reproduced. In addition, the frequency converted carrier chrominance signal in the adjacent track and included as crosstalk upon reproduction of the other of the mutually adjacent tracks, can be eliminated by a filter which is used for separating the frequency modulated luminance signal. Accordingly, it is possible to prevent undesirable effects from being introduced in the picture due to the crosstalk from the adjacent tracks, even when reproducing a recording medium which has a track pattern in which no guard band is formed and there is no H-alignment, that is, the positions where the horizontal synchronizing signals are recorded in the adjacent tracks are not arranged in alignment along a direction perpendicular to the longitudinal direction of the track. As a result, there is no need to make the track width narrow, because there is no need to form the guard band between the adjacent tracks. Hence, it is possible to obtain a reproduced signal having a desired signal-to-noise (S/N) ratio. Furthermore, it is possible to carry out a special reproduction by performing a so-called skew jump which makes the intervals of the horizontal synchronizing signals constant with respect to a recording medium which has a track pattern in which there is no H-alignment. Moreover, because the delay circuit for providing a delay of the reproducing period of one track, and the switching circuit for alternately switching the input and output reproduced carrier chrominance signals of the delay circuit for every reproducing period of one track, are provided within the processing circuit which performs processing of the reproduced carrier chrominance signal, it is possible to continuously reproduce the carrier chrominance signal by substituting the carrier chrominance signal obtained from the previous track for a dropout in the carrier chrominance signal.

Other objects and further features of the present invention will be apparent from the following detailed description when read in conjunction with the accompanying drawings.

BRIEF DESCRIPTION OF THE DRAWINGS

FIG. 3 is a systematic block diagram showing an embodiment of a recording system of a color video signal recording and/or reproducing system according to the present invention;

FIGS. 4A and 4B respectively show frequency spectrums of an input signal and an output signal of a flip-flop in the block system shown in FIG.3;

FIG. 7 is a systematic block diagram showing an embodiment of a reproducing system in a color video signal recording and/or reproducing system according to the present invention;

FIG. 8 is a systematic block diagram showing an embodiment of a color processing circuit within the block system shown in FIG. 7; and FIG. 9 is a systematic block diagram showing an essential part of a modification of the reproducing system shown in FIG. 7.

DETAILED DESCRIPTION

Figure 1:
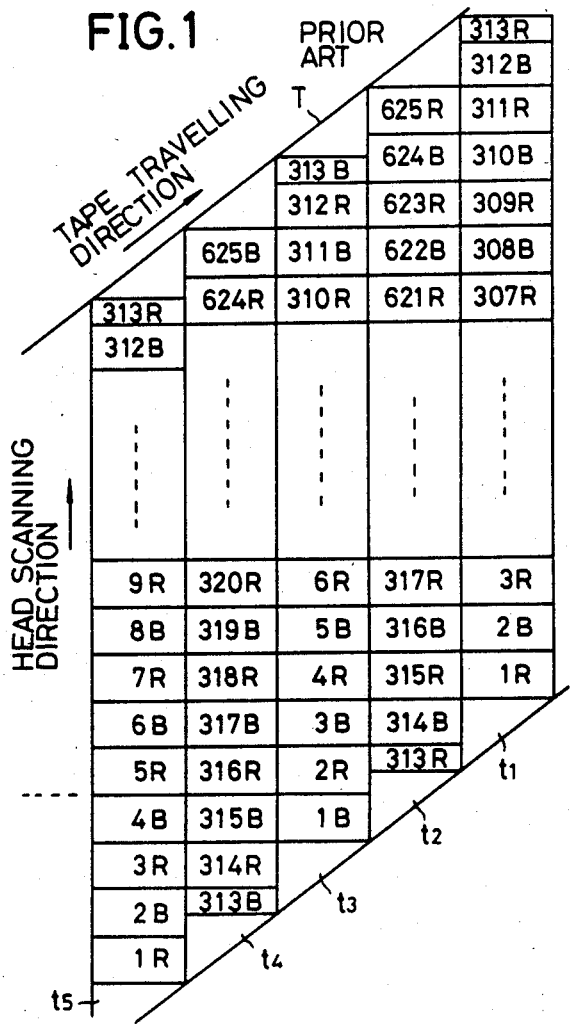
FIG. 1 shows a track pattern which indicates recorded positions of a SECAM system color video signal when carrying out a normal recording or reproduction.

A magnetic tape T onto which and/or from which a signal is recorded and/or reproduced by a general recording and/or reproducing system, has a track pattern shown in FIG. 1, for example. This track pattern is formed by magnetic heads having gaps of mutually different azimuth angles, so that mutually adjacent tracks on the tape T are formed by the magnetic heads having gaps of mutually different azimuth angles, without forming a guard band between the adjacent tracks. In FIG. 1, a first track t1 comprises intervals 1R, 2B, 3R, ..., 312B, and 313R, a second track t2 comprises intervals 313R, 314B, ..., 624B, and 625R, etc. Among the tracks shown in FIG. 1, the interval 1R represents an interval wherein a carrier chrominance signal obtained by frequency-modulating a chrominance subcarrier by a color difference signal R-Y in the first 1H (H indicates one horizontal scanning period) is recorded, the interval 2B represents an interval wherein a carrier chrominance signal obtained by frequency-modulating a chrominance subcarrier by a color difference signal B-Y in a subsequent 1H is recorded, the interval 3R represents an interval wherein a carrier chrominance signal obtained by frequency-modulating a chrominance subcarrier by a color difference signal R-Y in a third 1H is recorded, etc. In the representation of the intervals by a combination of a number and a character, the number indicates the number of the horizontal scanning line in one frame, the character R indicates that the modulating signal component of the carrier chrominance signal is the color difference signal R-Y, and the character B indicates that the modulating signal component of the carrier chrominance signal is the color difference signal B-Y.

In the case of the tape pattern shown in FIG. 1, the positions where the horizontal synchronizing signals are recorded in the adjacent tracks, are arranged in alignment along a direction perpendicular to the longitudinal direction of the track. That is, there is the so-called H-alignment. For example, with respect to the interval 1R in the track t1, the interval 315R in the track t2 is adjacent to the interval 1R in the adjacent track t1, and the interval 4R in the track t3 is adjacent to the interval 315 in the adjacent track t2. Thus, the modulating signal components of the carrier chrominance signals which are frequency converted in the low frequency range and recorded in these intervals 1R, 315R, and 4R, are the same. For this reason, the effect of crosstalk from the adjacent tracks with respect to the frequency converted carrier chrominance signal is small. Generally, there is correlation between signal components of one field intervals of the color video signal. For example, between the interval 1R and the interval 315R, the carrier chrominance signals recorded in these intervals are both frequency converted carrier chrominance signal having the color difference signal R-Y as the modulating signal, and the frequencies are substantially the same in these intervals. Hence, the crosstalk between the frequency converted carrier chrominance signals in the adjacent tracks is substantially zero, and there is hardly any effect on the demodulated color signal.

Figure 2:
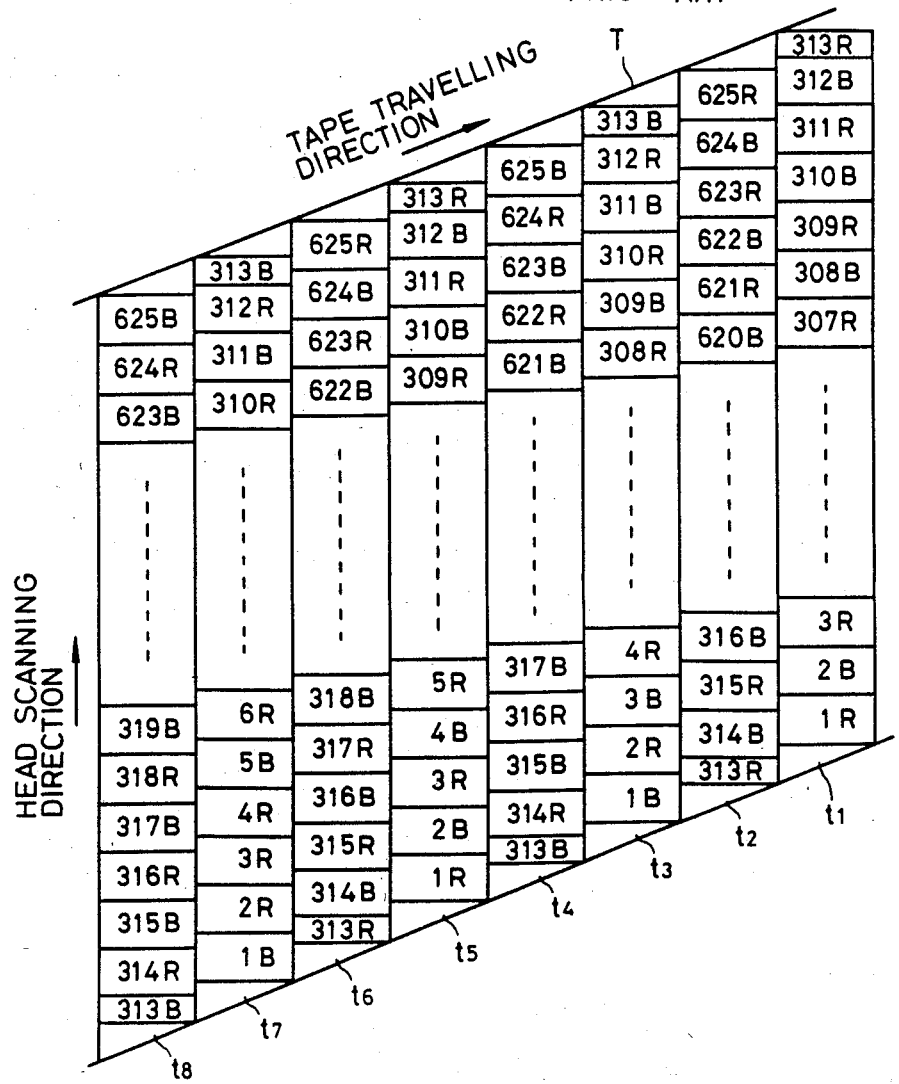
FIG. 2 shows a track pattern which indicates recorded positions of a SECAM system color video signal when carrying out a recording or reproduction by reducing the tape traveling speed to ½ the tape traveling speed upon normal recording or reproduction.

A long-duration recording and/or reproduction is sometimes carried out by the magnetic recording and/or reproducing apparatus which forms the track pattern shown in FIG. 1 during a normal recording mode. For example, when carrying out four hours of recording and/or reproduction by use of a magnetic tape designed for two hours of recording and/or reproduction, the diameter of the drum, the tape width, the rotational speed of the drum, and the number of horizontal scanning lines remain unchanged, and only the tape traveling speed is reduced to ½ the tape traveling speed which would otherwise be used for two hours of recording and/or reproduction with such a magnetic tape. The track pattern obtained when the tape traveling speed is reduced to ½ in this manner, is shown in FIG. 2. In the track pattern shown in FIG. 2, the positions where the horizontal synchronizing signals are recorded are not in alignment in the adjacent tracks, that is, there is no H-alignment. Accordingly, there is no correlation between the adjacent tracks, and the carrier frequencies of the frequency converted carrier chrominance signals differ in the adjacent tracks. In this case, because mutually adjacent tracks are recorded with magnetic heads which have gaps of mutually different azimuth angles, the azimuth loss is large with respect to the frequency modulated luminance signal in the high frequency range, and the effect of crosstalk from the adjacent tracks is extremely small for the frequency modulated luminance signal. However, because the recorded carrier chrominance signal is in the low frequency range, the azimuth loss is small with respect to the carrier chrominance signal. In addition, because the carrier frequencies of the recorded carrier chrominance signals differ in the mutually adjacent tracks, the effect of crosstalk from the adjacent tracks is large for the carrier chrominance signal, and beat interference is introduced.

The present invention has eliminated the problems of the system described heretofore. First, description will be given with respect to an embodiment of a recording system of a recording and/or reproducing system according to the present invention. A SECAM system color video signal which is applied to an input terminal 11, is supplied to a lowpass filter 12 and a bandpass filter 13. The luminance signal which is separated in the lowpass filter 12, is supplied to a frequency modulator 14 wherein a carrier is frequency modulated. An output frequency modulated wave of the frequency modulator 14 is supplied to a highpass filter 15 wherein an unwanted component is eliminated. An output of the highpass filter 15 is supplied to a mixer 16.

Figure 5A:
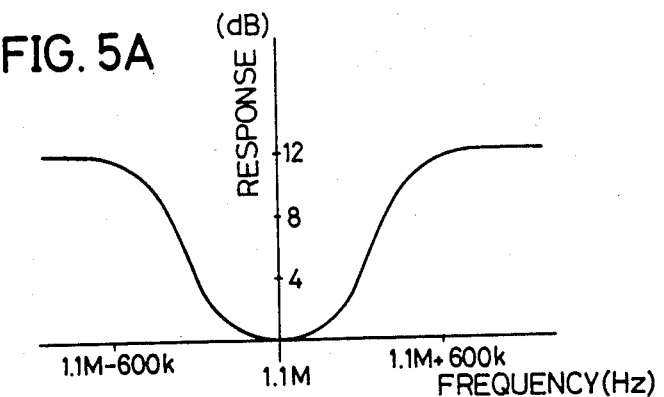
FIGS. 5A and 5B respectively show frequency characteristics of an equalizer circuit which is employed in a recording system and a reproducing system of the present invention.

The carrier chrominance signal which is separated in the bandpass filter 13, is supplied to an automatic chroma control (ACC) circuit 17. As is well known, this carrier chrominance signal is a signal in which a carrier of approximately 4.4 MHz is alternately frequency modulated by a (B-Y) signal or an (R-Y) signal, for every one horizontal scanning period (1H). The level of the carrier chrominance signal is made constant in the ACC circuit 17, and an output of the ACC circuit 17 is supplied to a limiter 18 wherein an unwanted amplitude fluctuation component is eliminated. An output carrier chrominance signal of the limiter 18 is successively supplied to flip-flops 19 and 20 which are connected in series and constitute a frequency dividing circuit. These flip-flops 19 and 20 each divide the frequency by multiplying the frequency by $\frac{1}{2}$. Accordingly, by this frequency division, a carrier chrominance signal which is frequency converted into a low frequency range is obtained from the flip-flop 20. This carrier chrominance signal which is frequency converted into the low frequency range (hereinafter simply referred to as a low-band converted carrier chrominance signal), has a center frequency of approximately 1.1 MHz which is $\frac{1}{4}$ the center frequency of the input carrier chrominance signal of the flip-flop 19, and has a frequency deviation width of 1.1 MHz±125 kHz which is $\frac{1}{4}$ the frequency deviation width of the input carrier chrominance signal of the flip-flop 19. This low-band converted carrier chrominance signal, is eliminated of its unwanted component in a lowpass filter 21 which has a cutoff frequency of 1.7 MHz. An output of the lowpass filter 21 is supplied to an equalizer circuit 22. The equalizer circuit 22 gives the low-band converted carrier chrominance signal a frequency characteristic shown in FIG. 5A.

The frequency spectrum of the input carrier chrominance signal of the flip-flop 19, is shown in FIG. 4A. As shown in FIG. 4A, the frequency spectrum comprises a frequency deviation I (4.4 MHz±500 kHz) of a center frequency $f_c$ (4.4 MHz), an upper sideband $II_U$, and a lower sideband $II_L$. The levels of the upper and lower sidebands $II_U$ and $II_L$ are relatively large. The frequency spectrum of the low-band converted carrier chrominance signal which is obtained from the flip-flop 20 as a result of the frequency division in the flip-flops 19 and 20, is shown in FIG. 4B. As shown in FIG. 4B, a frequency deviation $I_a$ is 1.1 MHz±125 kHz which is $\frac{1}{4}$ the width of the frequency deviation before the signal is frequency divided, however, the level remains substantially unchanged. On the other hand, the bands of upper and lower sidebands $II_{Ua}$ and $II_{La}$ indicated by portions with oblique lines are also reduced, and the levels of these upper and lower sidebands $II_{Ua}$ and $II_{La}$ are reduced to approximately $\frac{1}{4}$. Thus, because the frequency deviation band is reduced to $\frac{1}{4}$ as a result of the frequency division in the flip-flops 19 and 20, a color inversion phenomenon will not occur even by use of a recording and/or reproducing apparatus having a relatively narrow band.

However, because of the frequency division, the levels of the upper and lower sidebands are reduced to approximately $\frac{1}{4}$. Thus, the signal-to-noise (S/N) ratio is poor when such a low-band converted carrier chrominance signal is recorded. Hence, the equalizer circuit 22 gives the low-band converted carrier chrominance signal from the lowpass filter 21 the frequency characteristic shown in FIG. 5A. As a result, the levels of the upper and lower sidebands of the low-band converted carrier chrominance signal are increased as indicated by III in FIG. 4B. An output of this equalizer circuit 22 is supplied to a gate circuit 23. The S/N ratio upon recording is improved by the above increase in the levels of the upper and lower sidebands.

A rotary drum 26 which is provided with rotary video heads 25a and 25b at diametric positions thereof, constitutes a guide drum together with a stationary drum 27. The magnetic tape T is wrapped obliquely around the rotary drum 26 throughout an angular range of approximately 180°. A wheel 29 which is provided with a magnet, is fixed to the lower end of a rotary shaft of a motor 28. This motor 28 rotates the rotary drum 26. The wheel 29 operates together with a magnetic head 30, and the magnetic head 30 detects one drum pulse at a rate of once for one revolution of the rotary drum 26. This drum pulse is supplied to a gate pulse forming circuit 24. A gate pulse is obtained from the gate pulse forming circuit 24 while the heads 25a and 25b scan over the magnetic tape T, and this gate pulse is supplied to the gate circuit 23. In the present embodiment, the gate pulse repeatedly assumes a high level and a low level, for every one field period.

Accordingly, the gate circuit 23 passes the low-band converted carrier chrominance signal from the equalizer circuit 22 during a certain one field period, and supplies this passed low-band converted carrier chrominance signal to the mixer 16. On the other hand, the gate circuit 23 blocks the low-band converted carrier chrominance signal during a one field period subsequent to this certain one field period. These operations of the gate circuit 23 are alternately repeated for every one field period. Therefore, the mixer 16 is intermittently supplied to the low-band converted carrier chrominance signal from the gate circuit 23, with an interval of one field period.

A frequency division multiplexed signal comprising the frequency modulated luminance signal and the low-band converted carrier chrominance signal which is converted into the band which is lower than the band of the frequency modulated luminance signal, is thus obtained from the mixer 16 with an interval of one field period. In addition, only the frequency modulated luminance signal is obtained from the mixer 16 with an interval of one field, during periods other than the period in which the above frequency division multiplexed signal is obtained. These signals obtained from the mixer 16, are alternately recorded by the rotary video heads 25a and 25b on successive tracks on the magnetic tape T.

Figure 6:
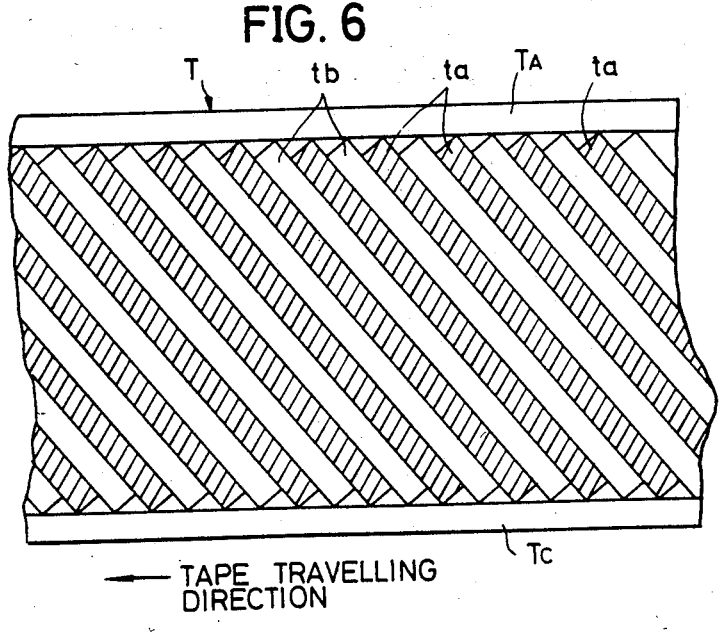
FIG. 6 shows a track pattern on a magnetic tape onto which and/or from which a signal is recorded by the system according to the present invention.

FIG. 6 shows an example of a track pattern which is formed on the magnetic tape T by the recording described above. In FIG. 6, video tracks are recorded without guardbands between an audio track TA and a control track TC. The video tracks are recorded obliquely to the longitudinal direction of the magnetic tape T. A video signal corresponding to one field is recorded on one video track. In FIG. 6, every second video tracks ta which are indicated with oblique lines, represent video tracks which are recorded with the frequency division multiplexed signal comprising the frequency modulated luminance signal and the low-band converted carrier chrominance signal. The remaining video tracks tb without the oblique lines, represent video tracks which are only recorded with the frequency modulated luminance signal. The video tracks ta and tb are adjacent to each other.

As is well known, the rotary video heads 25a and 25b have gaps of mutually different azimuth angles, and are provided on diametric positions of the rotary drum 26. The video tracks ta indicated with the oblique lines are recorded by the rotary video head 25a, and the video tracks tb are recorded by the rotary video head 25b.

Description will now be given with respect to an embodiment of a reproducing system of the recording and/or reproducing system according to the present invention, by referring to FIG. 7. The signals which are alternately reproduced from the video tracks on the magnetic tape T by the rotary video heads 25a and 25b, are supplied to a highpass filter 32 and a lowpass filter 33, through a preamplifier 31. The lowpass filter 33 has a cutoff frequency of 1.7 MHz. The frequency modulated luminance signal which is separated in the highpass filter 32, is supplied to a frequency demodulator 34 wherein the frequency modulated luminance signal is demodulated and restored into the original luminance signal. This luminance signal from the frequency demodulator 34 is supplied to a mixer 35.

Figure 5B:
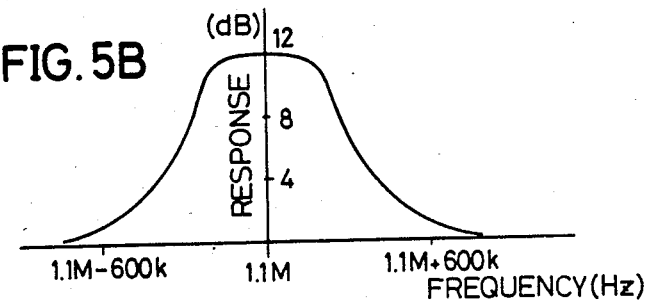

On the other hand, the reproduced low-band converted carrier chrominance signal which has a center frequency of approximately 1.1 MHz, is separated in the lowpass filter 33 with an interval of one field period. The separated low-band converted carrier chrominance signal is supplied to an equalizer circuit 36 which gives the signal a frequency characteristic shown in FIG. 5B. Thus, the levels of the sidebands of the low-band converted carrier chrominance signal are made substantially constant. An output of the equalizer circuit 36 is supplied to a 4-times frequency multiplier 37. As may be easily seen by comparing FIGS. 5A and 5B, the frequency characteristic shown in FIG. 5B is opposite to the frequency characteristic of the equalizer circuit 22 in the recording system shown in FIG. 5A. For example, the 4-times frequency multiplier 37 may be constituted from a circuit which comprises a half-wave rectifying circuit and a bandpass filter, and obtains the fourth order harmonic component obtained from the half-wave recitifying circuit so as to obtain a 4-times multiplied output. The frequency multiplier 37 may be constituted from a phase locked loop (PLL), or the like. As is well known, the frequency multiplier 37 multiplies the center frequency of the frequency modulated wave by four, and also multiplies the instantaneous frequency by four, so that the frequency deviation is multiplied by four. The carrier chrominance signal in the original band is thus obtained.

An output of the frequency multiplier 37 is supplied to a bandpass filter 38 wherein an unwanted frequency component is eliminated. A reproduced SECAM system carrier chrominance signal in which the center frequency and the frequency deviation are both restored to the original center frequency and frequency deviation, is obtained from the bandpass filter 38. This reproduced carrier chrominance signal is passed through a color processing circuit 39 which constitutes an essential part of the present invention, and supplied to the mixer 35. The reproduced carrier chrominance signal is hence mixed with the reproduced luminance signal from the frequency demodulator 34, in the mixer 35. As a result, a reproduced SECAM system color video signal is obtained through an output terminal 40. The output luminance signal of the frequency demodulator 34 is also supplied to a horizontal synchronizing signal separating circuit 41 wherein the horizontal synchronizing signal is separated. The separated horizontal synchronizing signal is obtained through an output terminal 42. In addition, the output gate pulse of the gate pulse forming circuit 24, is obtained through an output terminal 43.

FIG. 8 is a systematic block diagram showing an embodiment of a color processing circuit 39. In FIG. 8, the reproduced SECAM system carrier chrominance signal from the bandpass filter 38, is supplied to a frequency demodulator 52 through an input terminal 51. The reproduced carrier chrominance signal is demodulated in the frequency demodulator 52 and is formed into a line-sequential color difference signal in which the color difference signals (R-Y) and (B-Y) are time-sequentially multiplexed in an alternate manner for every one horizontal scanning period. This line-sequential color difference signal is supplied to an analog-to-digital (A/D) converter 53, and is converted into a digital signal having a transmission bit rate of 1.5 Mbps, and a quantization number of four bits, for example. The output digital signal of the A/D converter 53 is supplied to a one-field delay circuit 54 and to a first contact a of a switching circuit 55.

On the other hand, a timing generator 56 generates a clock signal in phase with the horizontal synchronizing signal which is supplied to the timing generator 56 from the terminal 42, through a terminal 57. The generated clock signal is supplied to the delay circuit 54. Accordingly, the delay circuit 54 accurately delays the input signal by a delay time of one field. The delay circuit 54 comprises two 64k random access memories (RAMs), for example. The delay circuit 54 delays the input signal by a delay time of one field, and supplies the delayed signal to a second contact b of the switching circuit 55. The gate pulse which is obtained from the output terminal 43, is supplied the switching circuit 55 through an input terminal 61 as a switching signal.

During a one field period in which the rotary video head 25a scans over one track ta on which the frequency division multiplexed signal of the frequency modulated luminance signal and the low-band converted carrier chrominance signal is recorded, the digital signal applied to the first contact a of the switching circuit 55 is supplied to a digital-to-analog (D/A) converter 58. On the other hand, during a one field period in which the rotary video head 25b scans over one track tb on which only the frequency modulated luminance signal is recorded, the digital signal applied to the second contact b of the switching circuit 55 is supplied to the D/A converter 58. That is, a moving contact of the switching circuit 55 is controlled and switched by the switching signal from the terminal 61, for every one field period so that the digital signals which are respectively applied to the first and second contacts a and b, are alternately supplied to the D/A converter 38 for every one field period (reproducing period of one track).

Accordingly, during the period in which the track ta is being reproduced, the switching circuit 55 produces the digital signal related to the carrier chrominance signal which is reproduced from that track ta. On the other hand, during the period in which the track tb is being reproduced, the switching circuit 55 produces the digital signal related to the carrier chrominance signal which is reproduced from a track ta which immediately precedes this track tb. In other words, the digital signal of one field related to the reproduced carrier chrominance signal, is repeated and obtained from the switching circuit 55 for two field periods.

The digital signal which is selectively produced from the switching circuit 55, is supplied to the D/A converter 58. The digital signal is subjected to a digital-to-analog conversion in the D/A converter 58 and is restored into the line-sequential color difference signal. The restored color difference signal is supplied to a frequency modulator 59. During one horizontal scanning period in which the color difference signal (R-Y) is supplied to the frequency modulator 59, the frequency modulator 59 produces a frequency modulated wave which is obtained by frequency modulating a carrier having a frequency of 4.40625 MHz by the color difference signal (R-Y). On the other hand, during a subsequent one horizontal scanning period in which the color difference signal (B-Y) is supplied to the frequency modulator 59, the frequency modulator 59 produces a frequency modulated wave which is obtained by frequency modulating a carrier having a frequency of 4.25 MHz by the color difference signal (B-Y). Hence, a reproduced carrier chrominance signal which is in conformance with the SECAM system, is obtained from the frequency modulator 59, and supplied to the mixer 35 through an output terminal 60.

It is possible conceive another design for the color processing circuit 39. The conceivable circuit may alternately and selectively produce first and second signals which are supplied to the switching circuit 55 for every one field period, where the first signal is the output line-sequential color difference signal of the frequency demodulator 52, and the second signal is a line-sequential color difference signal which is obtained by successively passing the first signal (line-sequential color difference signal) through the A/D converter 53, the one-field delay circuit 54, and the D/A converter 58 and is a signal which is delayed by one field. However, in this case, if the number of bits in the A/D converter 53 is small, a level difference may be introduced between the two kinds of analog line-sequential color difference signals which are selectively produced from the switching circuit 55. Thus, in order to prevent such a level difference from being introduced, it will be necessary to use an expensive A/D converter with a large number of bits. Further, when such an A/D converter with a large number of bits is used, the memories of the one-field delay circuit 54 must have a large memory capacity. However, the cost of memories with such a large memory capacity is high. Therefore, the above conceivable circuit is not a desirable circuit.

On the other hand, in the color processing circuit 39 shown in FIG. 8, the switching circuit 55 alternately switches the undelayed digital signal from the A/D converter 53 and the delayed digital signal from the one-field delay circuit 54, for every one field period. Thus, there is no problem of a level difference from being introduced between the two kinds of digital signals which are selectively produced from the switching circuit 55. As a result, inexpensive memories with a relatively small memory capacity may be used in the one-field delay circuit 54.

According to the present embodiment, in two mutually adjacent video tracks on the magnetic tape T, one video track is recorded with a frequency division multiplexed signal of the frequency modulated luminance signal and the low-band converted carrier chrominance signal, and the other video track is recorded with only the frequency modulated luminance signal. The rotary video heads having gaps of mutually different azimuth angles alternately scan over these video tracks on the magnetic tape T. Hence, when one rotary video head scans over the video track which is recorded with the frequency division multiplexed signal of the frequency modulated luminance signal and the low-band converted carrier chrominance signal upon reproduction, the azimuth loss is large because the adjacent tracks are only recorded with the frequency modulated luminance signals which are of high frequencies. Therefore, there is virtually no crosstalk component within the reproduced signal which is obtained when the one rotary video head is scanning over the video track which is recorded with the frequency division multiplexed signal.

On the other hand, when the other of the rotary video heads scans over the track which is only recorded with the frequency modulated luminance signal upon reproduction, the azimuth loss is relatively small because the low-band converted carrier chrominance signals recorded on the adjacent tracks are of relatively low frequencies. As a result, crosstalk components are reproduced. However, these crosstalk components are eliminated in the highpass filter 32, so that there is virtually no effect of these crosstalk components. Accordingly, there is no undesirable effect of crosstalk even when signals are reproduced from a magnetic tape having the track pattern shown in FIG. 2 wherein there is no H-alignment, and it is possible to obtain a high-quality reproduced SECAM system color video signal.

Because the bands of the color difference signals are narrow, flicker is unlikely to be introduced even in the case of a moving picture although the same signal is used for two field periods according to the present embodiment.

In the recording system shown in FIG. 3, although not shown, it is preferable to provide a clamping circuit between the output of the limiter 18 and the input of the flip-flop 19, so that the output of the limiter 18 is clamped during the horizontal blanking period and the vertical blanking period of the video signal. In the SECAM system carrier chrominance signal, there are parts where no color information is present. However, by providing the above clamping circuit, it is possible to prevent beat from being introduced due to the parts where no color information is present, and the S/N ratio can accordingly be improved.

An essential part of a modification of the reproducing system shown in FIG. 7, is shown in FIG. 9. In FIG. 9, those parts which are the same as those corresponding parts in FIG. 7 are designated by the same reference numerals. The carrier chrominance signal which is separated in the lowpass filter 33, is supplied to an input terminal 71, and the carrier chrominance signal which is obtained through an output terminal 72 is supplied to the mixer 35. In the present modification, the difference from the embodiment shown in FIG. 7 is that the color processing circuit 39 is provided in a stage preceding the frequency multiplier 37, and not subsequent to the frequency multiplier 37 as in the embodiment shown in FIG. 7. Thus, according to the present modification, the color processing described before in conjunction with FIG. 8 is carried out in the color processing circuit 39 with respect to the low-band converted carrier chrominance signal. The frequency multiplication is carried out in the frequency multiplier 37 after this color processing. The effects obtained according to the present modification are the same as the effects obtained by the embodiment described before.

The present invention is not limited to the embodiment described previously. For example, a filter having a characteristic in which the level is attenuated in a certain narrow frequency band compared to other frequencies, may be connected between the ACC circuit 17 and the limiter 18 in FIG. 2. In this case, a filter having a characteristic in which the level is attenuated in a frequency range excluding the certain frequency band, is connected between the bandpass filter 38 and the color processing circuit in FIG. 7. When such filters are provided, it is possible to improve the transmission characteristic of the carrier chrominance signal.

The present invention is especially suited for application in a magnetic recording and/or reproducing apparatus which operates with a magnetic tape having a track pattern in which there is no H-alignment as shown in FIG. 2. However, the present invention can also be applied to a magnetic recording and/or reproducing apparatus which operates with a magnetic tape having a track pattern in which there is H-alignment as shown in FIG. 1. Further, the track pattern may have guard bands between the adjacent video tracks. Moreover, the recording medium is not limited to a magnetic tape, and the recording medium may be other recording mediums such as a sheet-form magnetic disc.

Further, when an analog delay element is used for the one-field delay circuit 54, the A/D converter 53, the D/A converter 58, and the like are not required in the color processing circuit 39. Moreover, the frequency demodulator 52, and the frequency modulator 59 are also not required.

In addition, the present invention is not limited to the application to the recording and reproduction of the SECAM system color video signal, and can also be applied to recording and reproduction of an NTSC system color video signal and a PAL system color video signal. In such a case, when carrying out the recording, it is unnecessary to take countermeasures with respect to the crosstalk as disclosed in a U.S. Pat. No. 4,178,606 in which the assignee is the same as the assignee of the present application. That is, there is no need to successively shift the phase of the low-band converted carrier chrominance signal by 90° in one direction for every 1H with respect to one track, and there is no need to shift the phase of the low-band converted carrier chrominance signal by 90° in a direction opposite to the direction of the phase shift in the one track with respect to a track which is adjacent to the one track when the color video signal is the NTSC system signal. Accordingly, when the present invention is applied to the recording and reproduction of the NTSC system color video signal and the PAL system color video signal, it becomes unnecessary to provide phase shifting means in both the recording system and the reproducing system. Thus, the circuit construction of the recording system and the reproducing system can be simplified, and the cost of the circuit can accordingly by reduced.

Further, the present invention is not limited to these embodiments, but various variations and modifications may be made without departing from the scope of the present invention.

What is claimed is:

1. A color video signal recording system comprising:
    recording means for recording a recording signal on each track on a recording medium;
    separating means for separating an input color video signal into a luminance signal and a carrier chrominance signal;
    frequency modulating means for frequency modulating a carrier by the luminance signal which is separated in said separating means, and for producing a frequency modulated luminance signal;
    frequency converting means for frequency converting the carrier chrominance signal which is separated in said separating means, into a band which is lower than a band occupied by said frequency modulated luminance signal;
    gating means for passing an output frequency converted carrier chrominance signal of said frequency converting means with an interval of one track scanning period in which said recording means scans over one track on said recording medium; and
    mixing means for mixing the frequency modulated luminance signal from said frequency modulating means and the frequency converted carrier chrominance signal which is intermittently obtained from said gating means with the interval of one track scanning period,
    said mixing means alternately producing a mixed multiplexed signal in which the frequency modulated luminance signal and the frequency converted carrier chrominance signal are multiplexed, and a signal solely comprising the frequency modulated luminance signal, for every one track scanning period,
    said output signal of said mixing means being supplied to said recording means as said recording signal.

2. A recording system as claimed in claim 1 in which said frequency converting means comprises a frequency dividing circuit.

3. A color video signal recording and reproducing system comprising:
    recording and reproducing means for recording and reproducing a recording signal onto and from each track on a recording medium;
    first separating means for separating an input color video signal into a luminance signal and a carrier chrominance signal;
    frequency modulating means for frequency modulating a carrier by the luminance signal which is separated in said first separating means, and for producing a frequency modulated luminance signal;
    first frequency converting means for frequency converting the carrier chrominance signal which is separated in said first separating means, into a band which is lower than a band occupied by said frequency modulated luminance signal;
    gating means for passing an output frequency converted carrier chrominance signal of said first frequency converting means with an interval of one track scanning period in which said recording and reproducing means scans over one track on said recording medium;
    first mixing means for mixing the frequency modulated luminance signal from said frequency modulating means and the frequency converted carrier chrominance signal which is intermittently obtained from said gating means with the interval of one track scanning period, said first mixing means alternately producing a mixed multiplexed signal in which the frequency modulated luminance signal and the frequency converted carrier chrominance signal are multiplexed, and a signal solely comprising the frequency modulated luminance signal, for every one track scanning period, said output signal of said first mixing means being supplied to said recording and reproducing means as said recording signal;

second separating means for separating a signal which is reproduced from said recording medium by said recording and reproducing means into the frequency modulated luminance signal and the frequency converted carrier chrominance signal;

demodulating means for demodulating the frequency modulated luminance signal which is separated in said second separating means;

second frequency converting means for frequency converting the frequency converted carrier chrominance signal which has the interval of one track scanning period and is separated in said second separating means, to restore the carrier chrominance signal into its original band;

signal processing means for restoring the carrier chrominance signal which has the interval of one track scanning period and is obtained from said second frequency converting means, into a continuous carrier chrominance signal, said signal processing means comprising delay means for delaying a supplied carrier chrominance signal which is supplied thereto by one track scanning period, and switching means for passing said supplied carrier chrominance signal during a period in which said supplied carrier chrominance signal exists and for passing an output delayed carrier chrominance signal of said delay means during a period in which no carrier chrominance signal is supplied to said delay means; and second mixing means for mixing the output luminance signal of said demodulating means and the output carrier chrominance signal of said signal processing means, to obtain a reproduced color video signal.

4. A recording and reproducing system as claimed in claim 3 in which said signal processing circuit further comprises frequency demodulating means for frequency demodulating a carrier chrominance signal which is supplied thereto, an analog-to-digital converter means for subjecting an output signal of said frequency demodulating means to an analog-to-digital conversion, and for supplying an output signal to said delay means and said switching means, digital-to-analog converter means for subjecting the output signal of said switching means to a digital-to-analog conversion, and means for frequency modulating an output signal of said digital-to-analog converter means, and for supplying an output signal to said second mixing means.

5. A recording and reproducing system as claimed in claim 4 in which said signal processing means further comprises generating means for generating a clock signal in phase with a horizontal synchronizing signal when supplied with the horizontal synchronizing signal, and said clock signal generated by said generating means controls the delay operation of said delay means.

6. A recording and reproducing system as claimed in claim 5 in which said one track scanning period corresponds to one field period of said color video signal, and said delay means comprises a one-field delay circuit for delaying the supplied carrier chrominance signal by one field period.

7. A recording and reproducing system as claimed in claim 3 in which said first frequency converting means comprises a frequency dividing circuit, and said second frequency converting means comprises a frequency multiplying circuit.

8. A color video signal recording and reproducing system comprising:

recording and reproducing means for recording and reproducing a recording signal onto and from each track on a recording medium;

first separating means for separating an input color video signal into a luminance signal and a carrier chrominance signal;

frequency modulating means for frequency modulating a carrier by the luminance signal which is separated in said first separating means, and for producing a frequency modulated luminance signal;

first frequency converting means for frequency converting the carrier chrominance signal which is separated in said first separating means, into a band which is lower than a band occupied by said frequency modulated luminance signal;

gating means for passing an output frequency converted carrier chrominance signal of said first frequency converting means with an interval of one track scanning period in which said recording and reproducing means scans over one track on said recording medium;

first mixing means for mixing the frequency modulated luminance signal from said frequency modulating means and the frequency converted carrier chrominance signal which is intermittently obtained from said gating means with the interval of one track scanning period, said first mixing means alternately producing a mixed multiplexed signal in which the frequency modulated luminance signal and the frequency converted carrier chrominance signal are multiplexed, and a signal solely comprising the frequency modulated luminance signal, for every one track scanning period, said output signal of said first mixing means being supplied to said recording and reproducing means as said recording signal;

second separating means for separating a signal which is reproduced from said recording medium by said recording and reproducing means into the frequency modulated luminance signal and the frequency converted carrier chrominance signal;

demodulating means for demodulating the frequency modulated luminance signal which is separated in said second separating means;

signal processing means for restoring the frequency converted carrier chrominance signal which has the interval of one track scanning period and is separated in said second separating means, into a continuous carrier chrominance signal, said signal processing means comprising delay means for delaying a supplied carrier chrominance signal which is supplied thereto by one track scanning period, and switching means for passing said supplied carrier chrominance signal during a period in which said supplied carrier chrominance signal exists and for passing an output delayed carrier chrominance signal of said delay means during a period in which no carrier chrominance signal is supplied to said delay means;

second frequency converter means for frequency converting the carrier chrominance signal which has the interval of one track scanning period and is obtained from said signal processing means, to restore carrier chrominance signal into its original band; and second mixing means for mixing the output luminance signal of said demodulating means and the output carrier chrominance signal of said second frequency converter means, to obtain a reproduced color video signal.

* * * * *